US007446750B2

(12) United States Patent
Moon

(10) Patent No.: US 7,446,750 B2
(45) Date of Patent: Nov. 4, 2008

(54) INVERTER AND LIQUID CRYSTAL DISPLAY INCLUDING INVERTER

(75) Inventor: Seung-Hwan Moon, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 650 days.

(21) Appl. No.: 10/849,946

(22) Filed: May 21, 2004

(65) Prior Publication Data
US 2004/0246226 A1    Dec. 9, 2004

(30) Foreign Application Priority Data
May 23, 2003  (KR) .................. 10-2003-0032952
Feb. 2, 2004  (KR) .................. 10-2004-0006582

(51) Int. Cl.
*G09G 3/36*  (2006.01)
(52) U.S. Cl. ........................... 345/102; 315/224
(58) Field of Classification Search .......... 345/102; 315/227, 224; 362/97
See application file for complete search history.

(56) References Cited

U.S. PATENT DOCUMENTS 6,104,146 A * 8/2000 Chou et al. ............... 315/277
6,130,509 A * 10/2000 Kates et al. .............. 315/224
6,272,027 B1   8/2001 Fraidlin
6,633,287 B1 * 10/2003 Yatabe et al. ............. 345/211
2002/0021564 A1 * 2/2002 Cho et al. ................. 362/97

FOREIGN PATENT DOCUMENTS

CN   1092914     9/1994
JP   09-035690   2/1997

OTHER PUBLICATIONS

Office Action for Chinese Patent Application No.:200410038365.X; English translation.
English Abstract, Publication No. JP-09-035690.
Office Action for Chinese Patent Application No.:200410038365.X; English translation, Office Action date unknown.

* cited by examiner

*Primary Examiner*—Amr Awad
*Assistant Examiner*—Yong Sim
(74) *Attorney, Agent, or Firm*—MacPherson Kwok Chen & Heid LLP

(57) ABSTRACT

An inverter is provided, which includes: a voltage converter that converts a DC voltage from an external device into an AC voltage to drive at least a lamp and includes a primary coil and first and second secondary coils connected in series; a current sensor that senses at least a current flowing in the first or second secondary coil and generate at least a sensing signal based on the sensed at least a current; a feedback signal generator that generates a feedback signal based on the at least a sensing signal from the current sensor; and a controller that controls the voltage converter based on the feedback signal such that a tube current flowing in the at least a lamp keeps substantially constant.

19 Claims, 10 Drawing Sheets

Rf:Rinx:Riny=1:1.5:3

Rf:Rinx:Riny=1:3:1.5

INVERTER AND LIQUID CRYSTAL DISPLAY INCLUDING INVERTER

BACKGROUND OF THE INVENTION (a) Field of the Invention

The present invention relates to an inverter and a liquid crystal display including an inverter.

(b) Description of the Related Art

Display devices used for monitors of computers and television sets include self-emitting displays such as light emitting diodes (LEDs), electroluminescences (ELs), vacuum fluorescent displays (VFDs), field emission displays (FEDs) and plasma panel displays (PDPs) and non-emitting displays such liquid crystal displays (LCDs) requiring light source.

An LCD includes two panels provided with field-generating electrodes and a liquid crystal (LC) layer with dielectric anisotropy interposed therebetween. The field-generating electrodes supplied with electric voltages generate electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD or may be natural light. When using the equipped light source, the total brightness of the LCD screen is usually adjusted by regulating the ratio of on and off durations of the light source or regulating the current through the light source.

A lighting device for an LCD, i.e., a backlight unit usually includes a plurality of fluorescent lamps such as external electrode fluorescent lamps (EEFLs) and cold cathode fluorescent lamps (CCFLs) as light sources, which uniformly transmit the light to the entire front surface of the LC panels from the rear of the LC panels.

Although the CCFLs have been mainly used in the backlight unit for the LCD, the EEFLs have been recently watched due to relatively low cost and simplicity of driving lamps connected in parallel. Since the CCFL has an internal electrode in a glass tube, it needs a separate ballast capacitor. However, since the EEFL has external electrodes in both ends of a glass tube, it needs no separate ballast capacitor. The glass tube included in the EEFL separates the external electrode from the inside of the glass tube to function as a ballast capacitor. Accordingly, in this case, it is relatively easy to drive lamps connected in parallel.

This EEFL must be supplied with the lamp tube voltages having the same magnitude at both ends of the lamps since the EEFL has a symmetrical structure that ballast capacitors are placed in both ends of the glass tube. Moreover, the EEFL must have a difference between the voltages applied at both ends of the glass tube. Accordingly, it is difficult to employ ground type fluorescent lamp driving method that one of electrodes in the lamp is fixed at a predetermined voltage such as a ground. Therefore, the EEFL is adapted to employ floating type fluorescent lamp driving method that voltages having the same magnitude and the different polarities are applied at both ends of the lamp. In other words, phase difference between the voltages is 180°

The backlight unit includes an inverter for driving these lamps. The inverter converts a DC (direct current) input voltage into an AC (alternating current) voltage and applies the AC voltage to the lamps. Then, the inverter controls a light source according to input luminance control voltage to adjust luminance of the lamps.

In order to maintain uniform luminance, it is important to control a tube current flowing through the lamp such that the tube current is constant. However, it is not easy to control the tube current in floating type fluorescent lamp driving method due to no lamp electrode connected to a ground.

Meanwhile, the inverter includes a transformer for converting a low voltage into a high voltage. Since the transformer induces the high voltage having a high frequency, leakage currents occur to flow in the transformer, a transformer cover, the lamp, and so on. However, when the inverter controls the voltage applied to the lamp on the basis of the currents flowing in the inverter without considering the leakage currents, the tube current may be unstable. Accordingly, luminance of the LC panel may not become uniform.

SUMMARY OF THE INVENTION

An inverter is provided, which includes: a voltage converter that converts a DC voltage from an external device into an AC voltage to drive at least a lamp and includes a primary coil and first and second secondary coils connected in series; a current sensor that senses at least a current flowing in the first or second secondary coil and generate at least a sensing signal based on the sensed at least a current; a feedback signal generator that generates a feedback signal based on the at least a sensing signal from the current sensor; and a controller that controls the voltage converter based on the feedback signal such that a tube current flowing in the at least a lamp keeps substantially constant.

The at least a lamp may include a plurality of lamps connected in parallel.

The voltage converter may apply voltages having the same magnitude and different polarities to respective ends of the at least a lamp.

The at least a lamp may include an external electrode lamp.

The current sensor may first and second resistors connected in series between the first secondary coil and the second secondary coil, and a third resistor connected between a predetermined voltage and a first node between the first resistor and the second resistor. The first to third resistors may have the same resistance.

The at least a sensing signal may include a first voltage at a second node between the first secondary coil and the first resistor.

The feedback signal generator may rectify the first voltage to generate the feedback signal.

The at least a sensing signal may further include a second voltage at the first node between the first resistor and the second resistor.

The feedback signal generator may include: a rectifier that rectifies the first and the second voltages; and an operation unit that generates the feedback signal expressed as a first-order function of the rectified voltages from the rectifier.

The operation unit may include: a first operational amplifier that inverts the rectified first voltage; and a second amplifier that doubles the rectified second voltage, adds the inverted first voltage from the first amplifier and the doubled rectified second voltage to generate a third voltage, and inverts the third voltage.

The at least a sensing signal may further include a third voltage at a third node between the second secondary coil and the second resistor.

The feedback signal generator may include: a rectifier that rectifies the first to third voltages; a first operation unit that generates a first feedback signal expressed as a first-order function of the rectified first and second voltages; and a second operation unit that generates a second feedback signal expressed as a first-order function of the rectified second and third voltages, wherein the feedback signal includes a smaller one of the first and second feedback signals.

The first operation unit may include: a first amplifier that inverts the rectified first voltage; and a second amplifier that doubles the rectified second voltage, adds the inverted first voltage from the first amplifier and the doubled rectified second voltage to generate a fourth voltage, and inverts the fourth voltage. The second operation unit may include: a third amplifier that inverts the rectified third voltage; and a fourth amplifier that doubles the rectified second voltage, adds the inverted third voltage from the third amplifier and the doubled rectified second voltage to generate a fifth voltage, and inverts the fifth voltage.

The at least a sensing signal may further include a second voltage at a third node between the second secondary coil and the second resistor.

The feedback signal generator may include: a rectifier that rectifies the first and second voltages; a first operation unit that generates a first feedback signal expressed as a first-order function of the rectified first and second voltages; and a second operation unit that generates a second feedback signal expressed as another first-order function of the rectified first and second voltages, wherein the feedback signal includes a smaller one of the first and second feedback signals.

The first operation unit may include: a fourth resistor; a fifth resistor; a first feedback resistor; and a first amplifier that receives the first and second voltages through the fourth and fifth resistors, respectively, and has a negative feedback connection through the first feedback resistor. The second operation unit may include: a sixth resistor; a seventh resistor; a second feedback resistor; and a second amplifier that receives the first and second voltages through the sixth and seventh resistors, respectively, and has a negative feedback connection through the second feedback resistor.

The resistance ratio of the first feedback resistor, the fourth resistor, and the fifth resistor may be about 1:3:1.5, and a resistance ratio of the second feedback resistor, the sixth resistor, and the seventh resistor is about 1:1.5:3.

The primary coil may include a first portion coupled with the first secondary coil to form a first transformer and a second portion coupled with the second secondary coil to form a second transformer, and the first transformer and a second transformer may be spaced apart from each other on a printed circuit board.

The first and second transformers may be located near respective ends of the printed circuit board in a length direction.

A liquid crystal display is provided, which includes: a lamp unit that includes a plurality of lamps; an inverter that converts a DC voltage from an external device into an AC voltage to drive the lamp unit; and a liquid crystal panel assembly that receives a light from the lamps to display images. The inverter includes: a voltage converter that includes a primary coil and first and second secondary coils connected in series; a current sensor that senses at least a current flowing in the first or second secondary coil and generate at least a sensing signal based on the sensed at least a current; a feedback signal generator that generates a feedback signal based on the at least a sensing signal from the current sensor; and a controller that controls the voltage converter based on the feedback signal such that a tube current flowing in the lamps keeps substantially constant.

The lamps may be connected in parallel.

The voltage converter may apply voltages having the same magnitude and different polarities to respective ends of the lamps.

The lamps may include an external electrode lamp.

The current sensor may include first and second resistors connected in series between the first secondary coil and second secondary coil, and a third resistor connected between a predetermined voltage and a first node between the first resistor and the second resistor. The first to third resistors have the same resistance.

The at least a sensing signal may include a first voltage at a second node between the first secondary coil and the first resistor. The at least a sensing signal may further includes either or both a voltage at the first node between the first resistor and the second resistor and a third voltage at a third node between the second secondary coil and the second resistor.

The liquid crystal display may further include an inverter printed circuit board that is equipped with the inverter, wherein the primary coil may include a first portion coupled with the first secondary coil to form a first transformer and a second portion coupled with the second secondary coil to form a second transformer, and the first transformer and a second transformer are spaced apart from each other on a printed circuit board.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
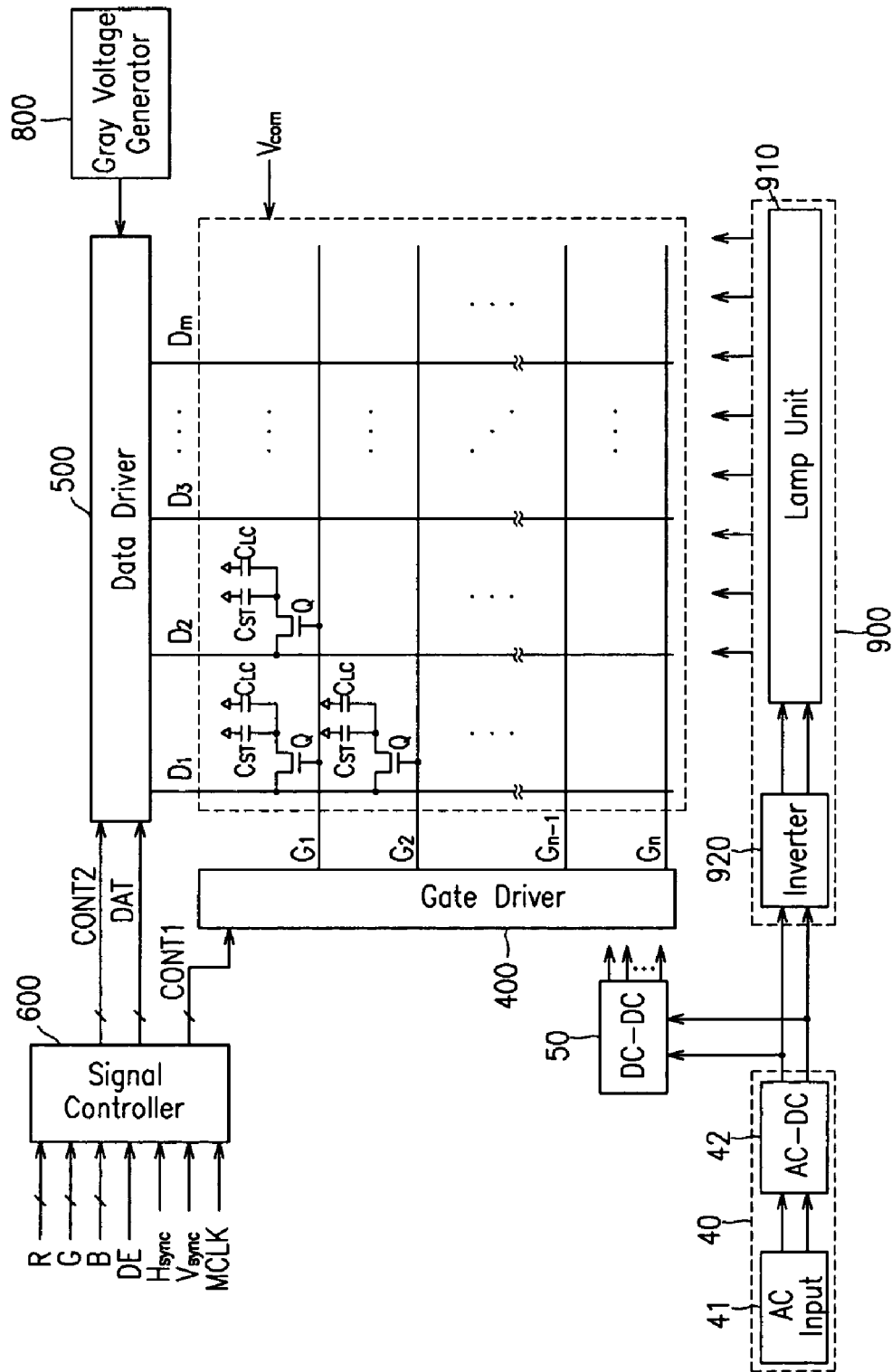
FIG. 1 is a block diagram of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, inverters and liquid crystal displays according to embodiments of the present invention will be described with reference to the accompanying drawings.

Figure 2:
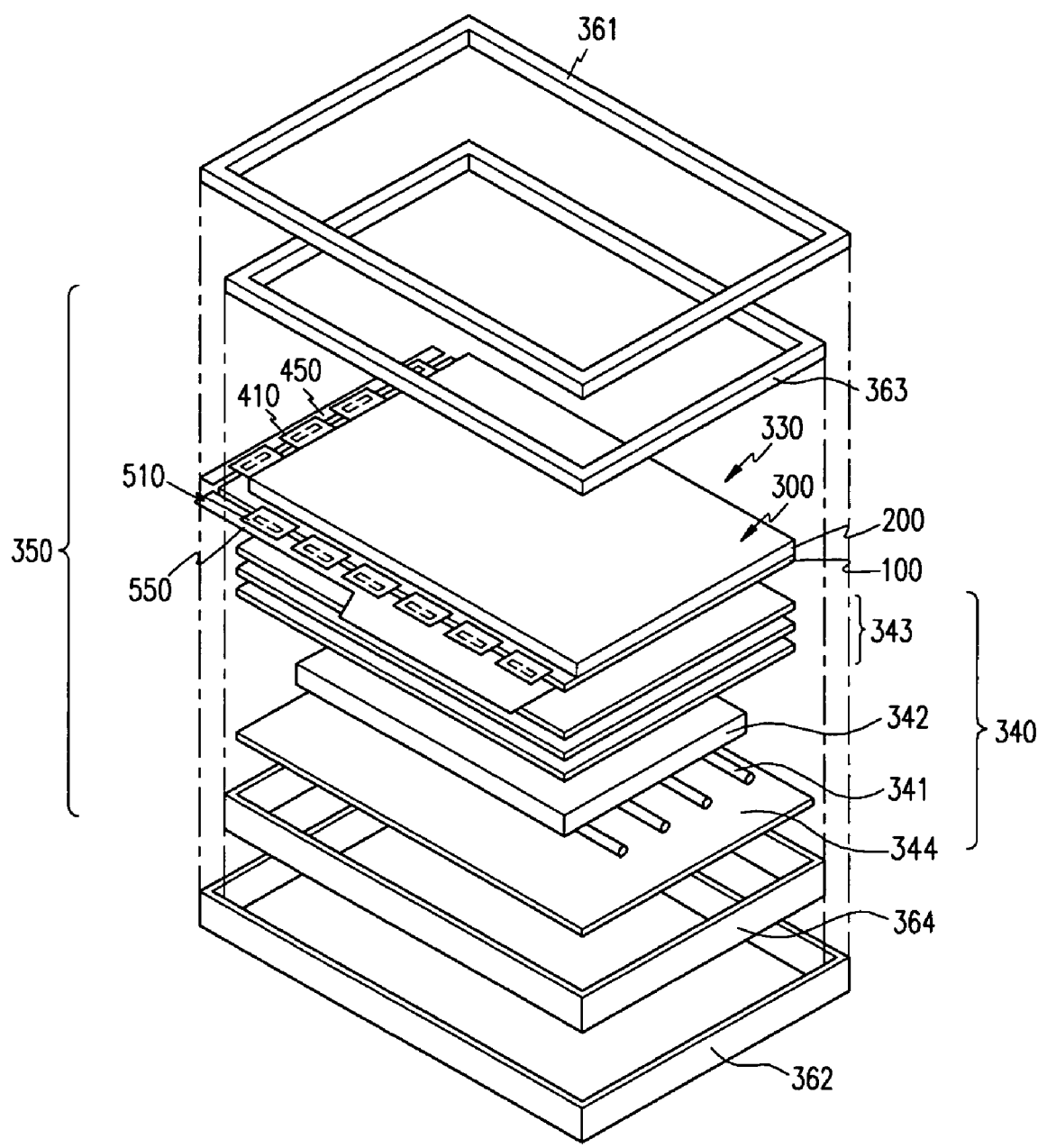
FIG. 2 is an exploded perspective view of an LCD according to an embodiment of the present invention.
Figure 3:
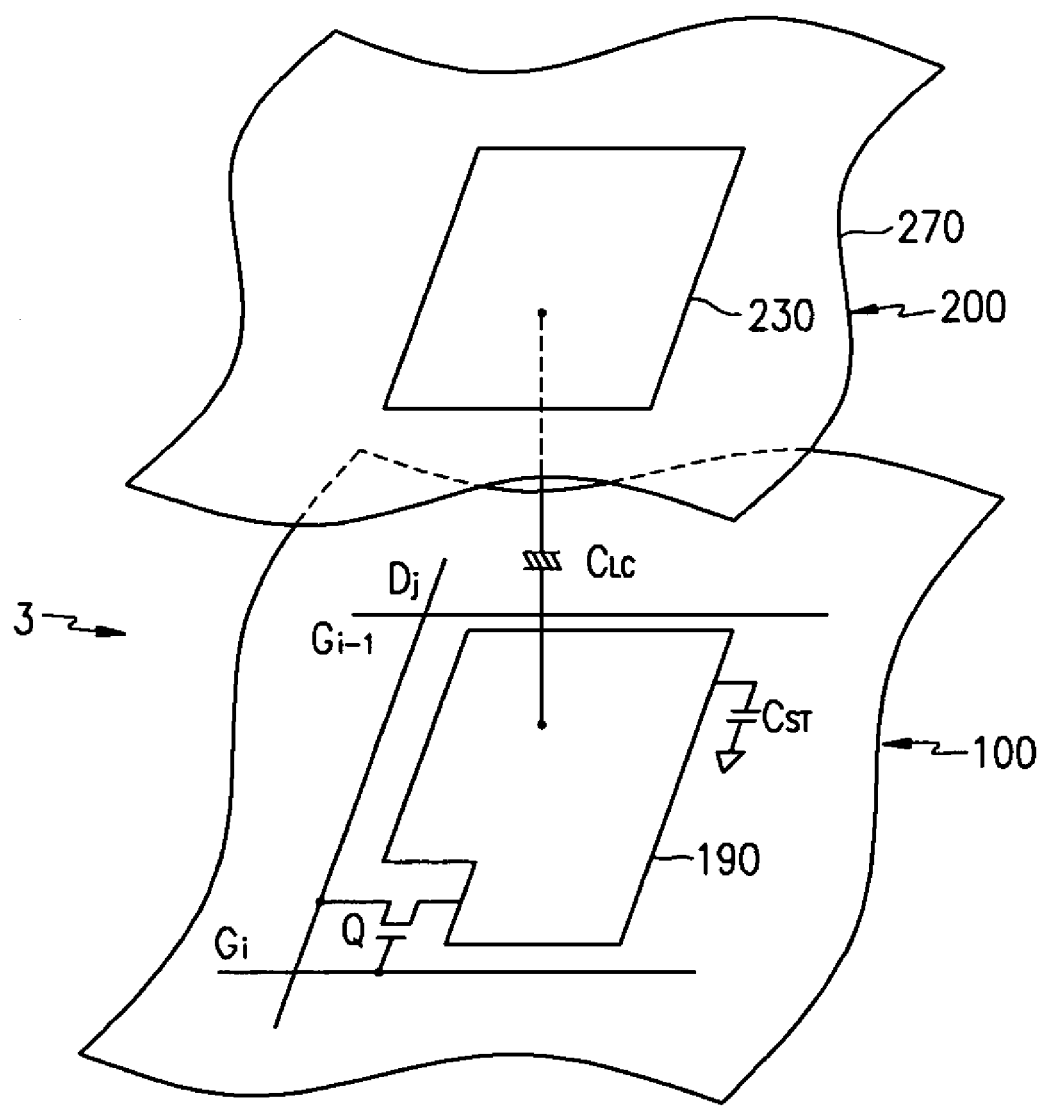
FIG. 3 is an equivalent circuit diagram of a pixel of an LCD according to an embodiment of the present invention.

FIG. 1 is a block diagram of an LCD according to an embodiment of the present invention, FIG. 2 is an exploded perspective view of an LCD according to an embodiment of the present invention, and FIG. 3 is an equivalent circuit diagram of a pixel of an LCD according to an embodiment of the present invention.

Referring to FIG. 2, an LCD according to an embodiment of the present invention includes a LC module 350 including a display unit 330 and a backlight unit 340, a pair of front and rear cases 361 and 362, a top chassis 363, and a mold frame 364 for containing the LC module 350.

The display unit 330 includes a LC panel assembly 300, a plurality of gate tape carrier packages (TCPs) 410 and a plurality of data TCPs 510 attached to the LC panel assembly 300, and a gate printed circuit board (PCB) 450 and a data PCB 550 attached to the associated TCPs 410 and 510, respectively.

The LC panel assembly 300 includes a lower panel 100, an upper panel 200, and a liquid crystal layer 3 interposed therebetween.

The lower panel 100 includes a plurality of display signal lines $G_1$-$G_n$ and $D_1$-$D_m$ and the lower and the upper panel 100 and 200 includes a plurality of pixels that are connected to the display signal lines $G_1$-$G_n$ and $D_1$-$D_m$ and arranged substantially in a matrix.

The display signal lines $G_1$-$G_n$ and $D_1$-$D_m$ include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q connected to the display signal lines $G_1$-$G_n$ and $D_1$-$D_m$ and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines $G_1$-$G_n$; an input terminal connected to one of the data lines $D_1$-$D_m$; and an output terminal connected to the LC capacitor $C_{LC}$ and the storage capacitor $C_{ST}$.

The LC capacitor $C_{LC}$ includes a pixel electrode 190 disposed on the lower panel 100, a common electrode 270 disposed on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, at least one of the pixel electrode 190 and the common electrode 270 may have shapes of bars or stripes when the common electrode 270 is provided on the lower panel 100.

The storage capacitor $C_{ST}$ is an auxiliary capacitor for the LC capacitor $C_{LC}$ and it is disposed on the lower panel 100. The storage capacitor $C_{ST}$ includes the pixel electrode 190 and a separate signal line (not shown), which overlaps the pixel electrode 190 via an insulator and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of three primary colors (i.e., spatial division) or each pixel represents three primary colors in turn (i.e., time division) such that spatial or temporal sum of the three primary colors are recognized as a desired color. The three primary colors may include red, green and blue. FIG. 3 shows an example of the spatial division that each pixel is provided with a color filter 230 in an area of the upper panel 200 facing the pixel electrode 190. Alternatively, the color filter 230 is provided on or under the pixel electrode 190 on the lower panel 100.

A pair of polarizers (not shown) polarizing the incident light are attached on the outer surfaces of the panels 100 and 200 of the panel assembly 300.

Referring to FIGS. 1 and 2, the gate TCPs 410 mounts gate integrated circuit (IC) chips forming a gate driver 400, and the data TCPs 510 mounts data IC chips forming a data driver 400. The gate driver 400 and the data driver 500 are electrically connected to the gate lines $G_1$-$G_n$ and the data lines $D_1$-$D_m$ of the panel assembly 300 through signal lines (not shown) formed on the TCPs 410 and 510, respectively.

The gate driver 400 generate gate signals including a gate-on voltage Von and a gate-off voltage Voff to for application to the gate lines $G_1$-$G_n$, and the data driver 500 applies data voltages to the data lines $D_1$-$D_m$.

Alternatively, the driving IC chips for the gate driver 400 and the data driver 500 may be directly mounted on the panel assembly without TCPs, which is called "chip on glass" (COG) type mounting. The gate driver 400 or the data driver 500 may be formed on the LC panel assembly 300 in company with the switching elements Q and the display signal lines $G_1$-$G_n$ and the data lines $D_1$-$D_m$.

The gate PCB 450 and the data PCB 550 mount a gray voltage generator 800 and a signal controller 600.

The gray voltage generator 800 generates two sets of a plurality of gray voltages related to the transmittance of the pixels and supplies the gray voltages used for the data voltages to the data driver 400. The gray voltages in one set have a positive polarity with respect to the common voltage Vcom, while those in the other set have a negative polarity with respect to the common voltage Vcom.

The signal controller 600 controls the drivers 400 and 500, etc.

Referring to FIGS. 1 and 2, the backlight unit 340, which corresponds to the lighting unit 900, includes a lamp unit 910 including a plurality of lamps 341 disposed behind the LC panel assembly 300, a plurality of optical mechanisms processing the light from the lamps 341, and an inverter 920 controlling the lamp unit 910.

Referring to FIG. 2, the optical mechanisms include a diffuser 342 and a plurality of optical sheets 343 that are disposed between the panel assembly 300 and the lamps 341 and guide and diffuse light from the lamps 341 to the panel assembly 300, and a reflector 344 that is disposed under the lamps 341 and reflects the light from the lamps 341 toward the panel assembly 300.

The lamps 341 preferably include fluorescent lamps such as CCFL (cold cathode fluorescent lamp) and EEFL (external electrode fluorescent lamp).

The diffuser 342 may be substituted with a light guide (not shown) and the lamps 341 may be disposed near one or both sides of the light guide, which is called an edge type mounting, while the lamp mounting shown in FIG. 2 is called a direct type mounting.

The inverter 920 adjusts the luminance of the panel assembly 300 by turning on/off the lamp unit 910 and by controlling on and off durations of the lamp unit 910. The inverter 920 may be mounted on a stand-alone inverter PCB (not shown) or mounted on the gate PCB 450 or the data PCB 550. The inverter 920 converts a DC (direct current) voltage into an appropriate AC (alternating current) voltage, and then it applies the voltage boosted by a transformer to the lamp unit 910. Furthermore, the inverter 920 generates a voltage related to a tube current flowing in the lamps 341 and controls the voltage applied to the lamps 341 on the basis of the generated voltage.

Referring to FIG. 1, the LCD further includes a power supply 40 and a DC-to-DC converter 50 connected thereto. The power supply 40 and the DC-to-DC converter 50 may be mounted on the gate PCB 450 or the data PCB 550 or implemented as stand-alone devices.

The power supply 40 includes an AC input unit 41 and an AC-to-DC rectifier 42 connected thereto. The AC input unit 41 is supplied with an AC voltage from an external device and supplies the AC voltage to the AC-to-DC rectifier 42. The AC-to-DC rectifier 42 converts the AC voltage into a DC voltage and supplies the DC voltage for the inverter 920 and the DC-to-DC converter 50.

The DC-to-DC converter 50 converts the DC voltage from the AC-to-DC rectifier 42 into several DC voltages such as the gate-on voltage Von and the gate-off voltage Voff and it supplies the predetermined DC voltages for the drivers 400 and 500, the signal controller 600, and the LC panel assembly 300.

Now, the operation of the LCD will be described in detail.

The signal controller 600 is supplied with input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the input image signals R, G and B suitable for the operation of the panel assembly 300 on the basis of the input control signals and the input image signals R, G and B, the signal controller 600 provides the gate control signals CONT1 for the gate driver 400, and the processed image signals DAT and the data control signals CONT2 for the data driver 500.

The gate control signals CONT1 include a vertical synchronization start signal STV for instructing to start the output of the gate-on voltage Von, a gate clock signal CPV for controlling the output time of the gate-on voltage Von, and an output enable signal OE for defining the duration of the gate-on voltage Von.

The data control signals CONT2 include a horizontal synchronization start signal STH for informing of the transmission of the image signals DAT, a load signal LOAD or TP for instructing to apply the data voltages to the data lines $D_1$-$D_m$, an inversion control signal RVS for reversing the polarity of the data voltages (with respect to the common voltage Vcom), and a data clock signal HCLK.

The data driver 500 receives a packet of the image data DAT for a pixel row from the signal controller 600 and converts the image data DAT into the analog data voltages selected from the gray voltages supplied from the gray voltage generator 800 in response to the data control signals CONT2 from the signal controller 600. Thereafter, the data driver 500 applies the data voltages to the data lines $D_1$-$D_m$.

Responsive to the gate control signals CONT1 from the signals controller 600, the gate driver 400 applies the gate-on voltage Von to the gate line $G_1$-$G_n$, thereby turning on the switching elements Q connected thereto. The data voltages applied to the data lines $D_1$-$D_m$ are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure by a unit of a horizontal period (which is indicated by 1H and equal to one period of the horizontal synchronization signal Hsync, the data enable signal DE, and a gate clock signal CPV), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages applied in one time are reversed (which is called "dot inversion").

Now, referring to FIG. 4, an inverter according to an embodiment of the present invention will be described in detail.

Figure 4:
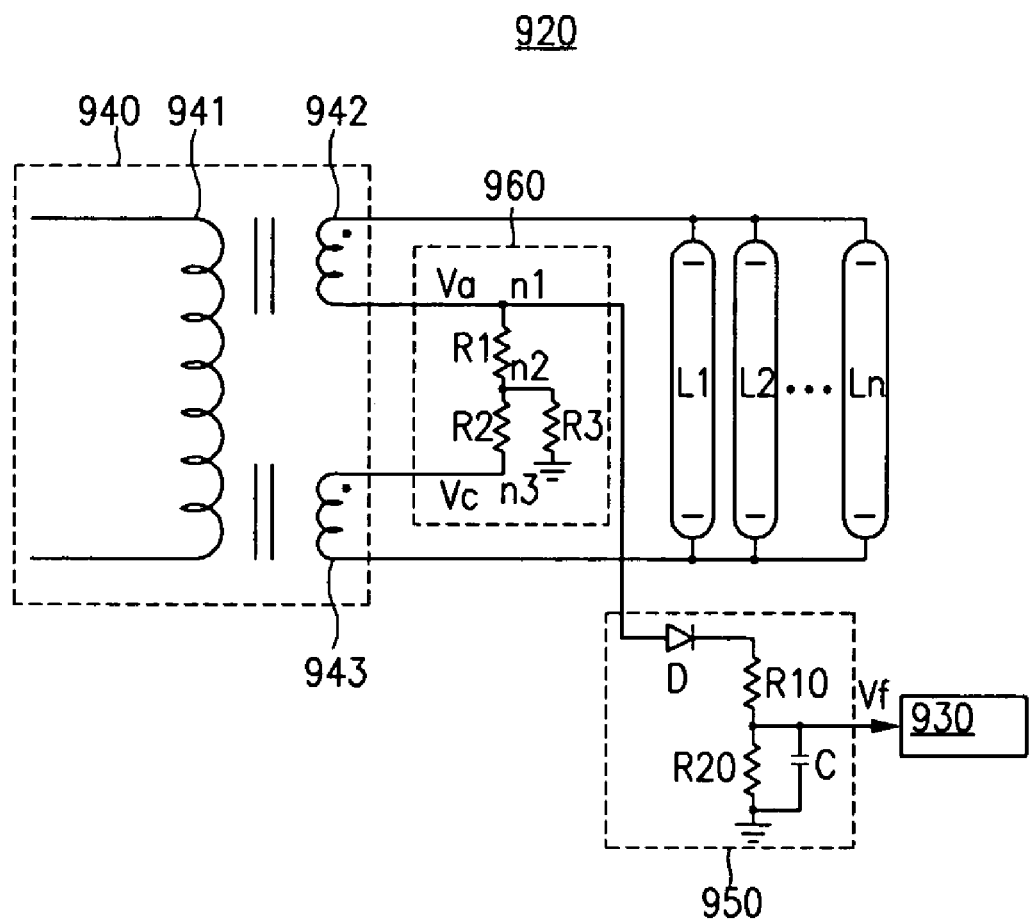
FIG. 4 is a circuit diagram of an inverter according to an embodiment of the present invention.

FIG. 4 is a circuit diagram of an inverter according to an embodiment of the present invention.

As shown in FIG. 4, the inverter 920 includes a voltage converter 940, a current sensor 960 connected to the voltage converter 940, a feedback unit 950 connected to the voltage converter 940, and a controller 930 connected to the feedback unit 950 and the voltage converter 940.

The voltage converter 940 converts a DC voltage supplied from the power supply 40 into an AC voltage and applies the AC voltage to a plurality of lamps L1-Ln connected in parallel.

The voltage converter 940 includes a transformer such as a wound transformer for boosting the AC voltage, which includes a primary coil 941 and a pair of secondary coils 942 and 943. High voltages are induced in the secondary coils 942 and 943 on the basis of the voltage applied to the primary coil 941. The induced voltages in the secondary coils 942 and 943 that are applied to respective ends of the lamps L1-Ln have the same magnitude and opposite polarities. This kind of driving is called a floating driving.

The current sensor 960 includes a pair of resistors R1 and R2 connected in series between the secondary coils 942 and 943 and a resistor R3 connected between a ground and a center node n2 located between the resistors R1 and R2. The three resistors R1-R3 preferably have the same resistance. The current sensor 960 senses the current in the secondary coil 942 and generates an AC voltage Va having a magnitude depending on the sensed currents.

The feedback unit 950 includes a rectifying diode D connected to a node n1 between the secondary coil 942 and the resistor R1 in a forward direction from the node n1, a voltage divider including a pair of resistors R10 and R20 connected in series between the diode D and a ground, and a smoothing capacitor C connected across the resistor R20. The feedback unit 950 receives the AC voltage from the current sensor 960 and converts the AC voltage into a DC voltage, and outputs the DC voltage as a feedback signal Vf. The magnitude of the feedback signal Vf is proportional to the total tube current flowing in the lamps L1-Ln.

The feedback unit 950 may employ a voltage Vc at a node n3 between the secondary coil 943 and the resistor R2 as an input AC voltage by connecting the diode D to the node n3.

The controller 930 receives the feedback signal Vf from the feedback unit 950 and controls the voltage converter 940 based on the feedback signal Vf such that the total current flowing in the lamps L1-Ln is uniform in spite of the load variation in the lamps L1-Ln.

The inverter 920 according to this embodiment can generate the feedback signal correctly representing the tube current to keep the tube current constant, thereby maintaining the luminance of the lamps to be uniform. Moreover, the current sensor and the feedback unit of the inverter have simple configurations.

Next, an inverter according to another embodiment of the present invention will be described in detail with reference to FIG. 5.

Figure 5:
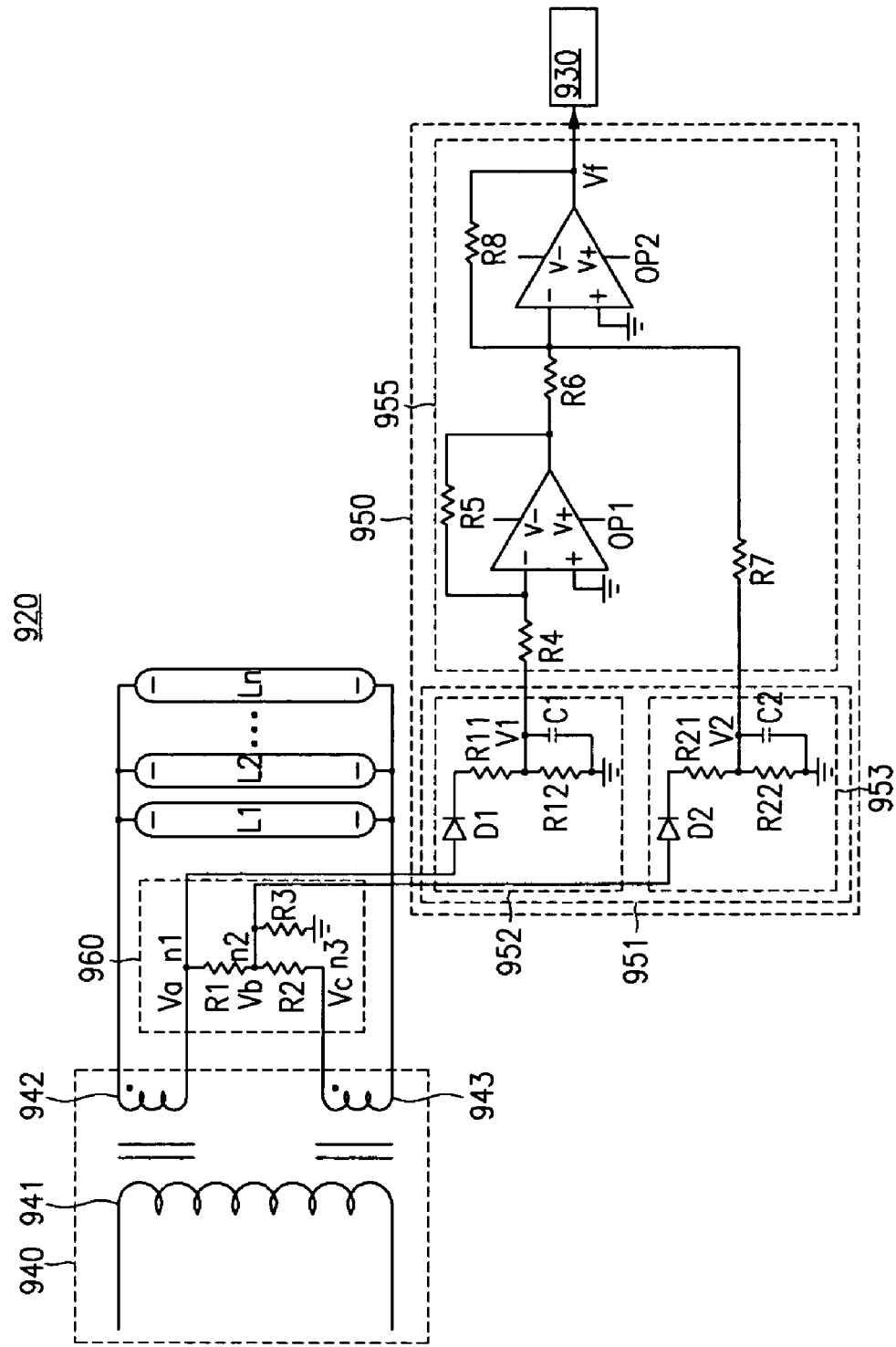
FIG. 5 is a circuit diagram of an inverter according to another embodiment of the present invention.

FIG. 5 is a circuit diagram of an inverter according to another embodiment of the present invention.

As shown in FIG. 5, the inverter 920 includes a voltage converter 940, a current sensor 960 connected to the voltage converter 940, a feedback unit 950 connected to the voltage converter 940, and a controller 930 connected to the feedback unit 950 and the voltage converter 940.

Since the voltage converter 940, the current sensor 960, and the controller 930 shown in FIG. 5 have substantially the same configurations as those shown in FIG. 4, the detailed description thereof will be omitted.

The voltage converter 940 includes a primary coil 941 and a pair of secondary coils 942 and 943 for driving a plurality of lamps L1-Ln.

The current sensor 960 includes three resistors R1, R2 and R3.

The feedback unit 950 includes a rectifier unit 951 converting AC voltages received from the current sensor 960 into DC voltages and an operation unit 955 generates a feedback signal Vf proportional to the total current flowing in the lamps L1-Ln based on the DC voltages supplied from the rectifier unit 951.

The rectifier unit 951 includes first and second rectifiers 952 and 953. Each of the rectifiers 952 and 953 includes a diode D1 or D2, a voltage divider, and a capacitor C1 or C2. The diode D1 is connected from a node n1 between the secondary coil 942 and the resistor R1 to the voltage divider in a forward direction, and the diode D2 is connected from a node n2 between the secondary coils 942 and 943 to the voltage divider in the forward direction. Each voltage divider includes a pair of resistors R11 and R12 or R21 and R22 connected in series between the diode D1 or D2 and a ground, and each capacitor C1 or C2 is connected across the resistor R12 or R22.

The first rectifier 952 rectifies a voltage Va at the node n1 in the secondary coil 942 of the voltage converter 940 to produce a DC voltage V1, while the second rectifier 953 rectifies a voltage Vb at the center node n2 between the secondary coils 942 and 943 of the voltage converter 940 to produce a DC voltage V2.

The operation unit 955 includes first and second operational amplifiers OP1 and OP2 having negative feedback connections with feedback resistors R5 and R8 and input resistors R4, R6 and R7. Each of the amplifiers OP1 and OP2 has a non-inverting terminal (+), an inverting terminal (−), and an output terminal and it is biased between the voltages V− and V+.

The input resistor R4 is connected between the inverting terminal (−) of the first amplifier OP1 and the output voltage V1 of the first rectifier 952. The input resistor R6 is connected between the inverting terminal (−) of the second amplifier OP2 and the output terminal of the first amplifier OP1, and the input resistor R7 is connected between the inverting terminal (−) of the second amplifier OP2 and the output voltage V2 of the second rectifier 953. The non-inverting terminals (+) of the first and second amplifiers OP1 and OP2 are connected to a ground.

The output of the first amplifier OP1 is given by $-(R5/R4) \cdot V1$, and the output of the second amplifier OP2, which is provided as a feedback signal Vf for the controller 930, is obtained by:

$$Vf = (R5/R4) \cdot (R8/R6) \cdot V1 - (R8/R7) \cdot V2,$$

where R4-R8 also indicate the resistances of the resistors R4-R8.

The above-described equation shows that the feedback signal Vf is represented by a first-order function of the voltages V1 and V2 from the first and second rectifiers 952 and 953, and, furthermore, it is dependent only on the resistances R4-R8. Accordingly, the feedback signal Vf can be represented by a desired first-order equation by appropriately setting the resistances R4-R8.

Figure 6:
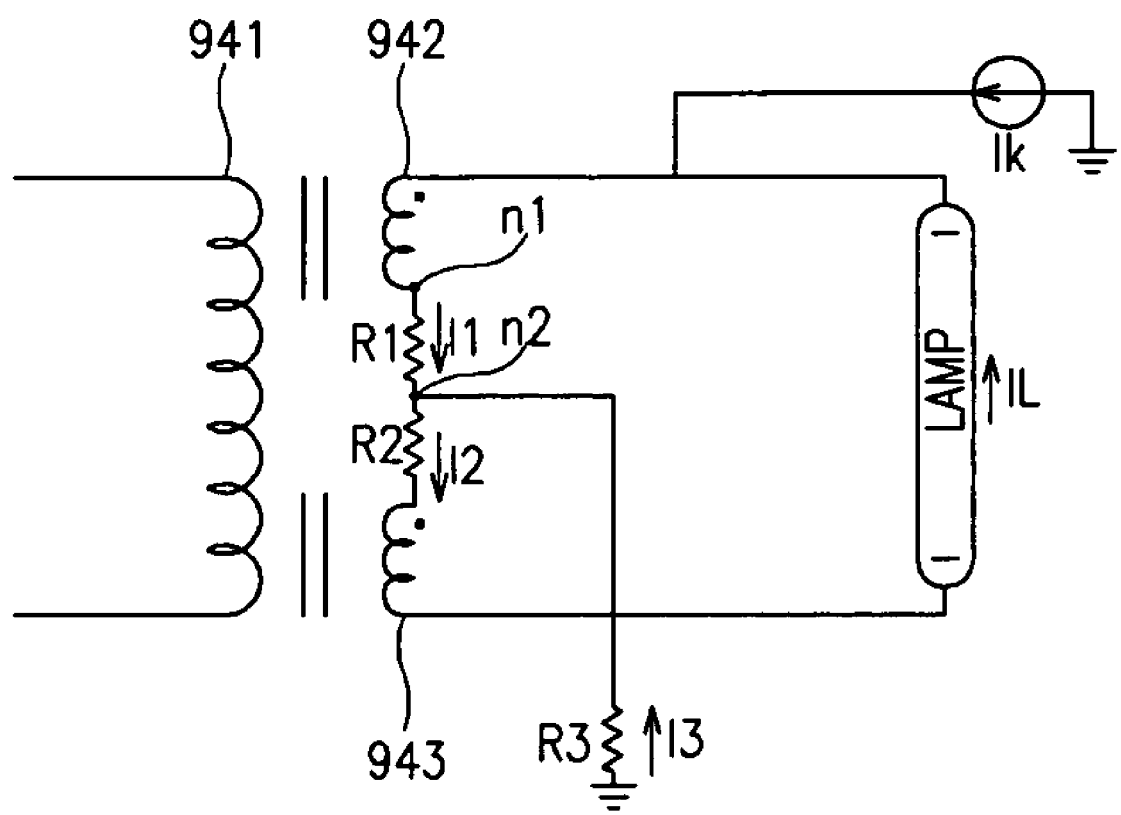
FIG. 6 is an equivalent circuit diagram showing currents flowing in the inverter and a lamp shown in FIG. 5.

FIG. 6 is an equivalent circuit diagram showing currents flowing in the inverter and a lamp shown in FIG. 5.

Generally, a transformer included in an inverter receives and generates high voltages with high frequencies. Accordingly, a leakage current can be generated in the transformer itself, a housing of the transformer, lamp wires connecting the transformer and lamps, the lamps, and so on.

As shown in FIG. 6, the inverter 920 applies voltages having the same magnitude and opposite polarities to respective ends of a lamp. Assuming that a leakage current Ik flows into the secondary coil 942, currents I1 and I2 passing through the resistors R1 and R2 are given by:

$$I1 = IL + Ik; \text{ and} \quad (1)$$

$$I2 = IL, \quad (2)$$

where IL is a tube current flowing in the lamp.

Applying the Kirchhoff's current law at the center node n2, I2 is rewritten as:

$$I2 = I1 + I3. \quad (3)$$

From Equations (1)-(3), the current I3 passing through the resistor R3 is expressed as:

$$I3 = -Ik. \quad (4)$$

This means that the leakage current Ik can be predictable by using the current I3 passing through the resistor R3.

From Equations (1) and (4), the tube current IL is obtained by:

$$IL = I1 - Ik = I1 + I3.$$

That is, the tube current IL can be expressed as a function of only the currents I1 and I3 without regard to the leakage current Ik.

As described above, the voltages Va and Vb at the nodes n1 and n2 are applied to the feedback unit 950.

When R1=R2=R3=R, the output voltages V1 and V2 of the first and second rectifiers 952 and 953 satisfy the relations:

$$V1 \propto Va = R \cdot I1 - R \cdot I3 = R \cdot (IL + 2 \cdot Ik); \text{ and} \quad (5)$$

$$V2 \propto Vb = R \cdot Ik. \quad (6)$$

Suppose a voltage drop across each diode D1 or D2 is negligible compared with the voltages Va and Vb and the voltage division ratio of the voltage divider in each rectifier 952 and 953 is relatively high, i.e. the voltages V1 and V2 inputted into the operation unit 955 are almost equal to the node voltages Va and Vb, respectively, then V≈Va and V2≈Va.

From Relations (5) and (6), the term including Ik is removed by multiplying V2 by two and by subtracting it from V1. That is, V1−2·V2=R·IL. Accordingly, the feedback signal Vf given by the above-described equation Vf=(R5/R4)·(R8/R6)·V1−(R8/R7)·V2 can represent the tube current by adjusting the resistances R4-R8 such that (R5/R4)·(R8/R6):(R8/R7)=1:2. For example, R4=R5=R6=R8=2·R7 yields:

$$Vf=V1-2\cdot V2=R\cdot IL. \quad (7)$$

As a result, the feedback unit 950 can provide the controller 930 with the feedback signal Vf proportional to only the tube current.

When supposing the leakage current Ik flow in the secondary coil 943 instead of the secondary coil 942, the feedback unit 950 can be configured such that a voltage Vc at a node n3 of the secondary coil 943 is inputted into the diode D1 instead of the voltage Va at the node n1 of the secondary coil 942. The symmetry in the circuit yields the same result.

To summarize, the inverter according to this embodiment generates the feedback signal Vf, which is exactly proportional to the tube current IL and is not interfered by the leakage current Ik, and thus the backlight unit can maintain uniform luminance under the floating type driving of the lamps.

Next, an inverter according to another embodiment of the present invention will be described in detail with reference to FIG. 7.

Figure 7:
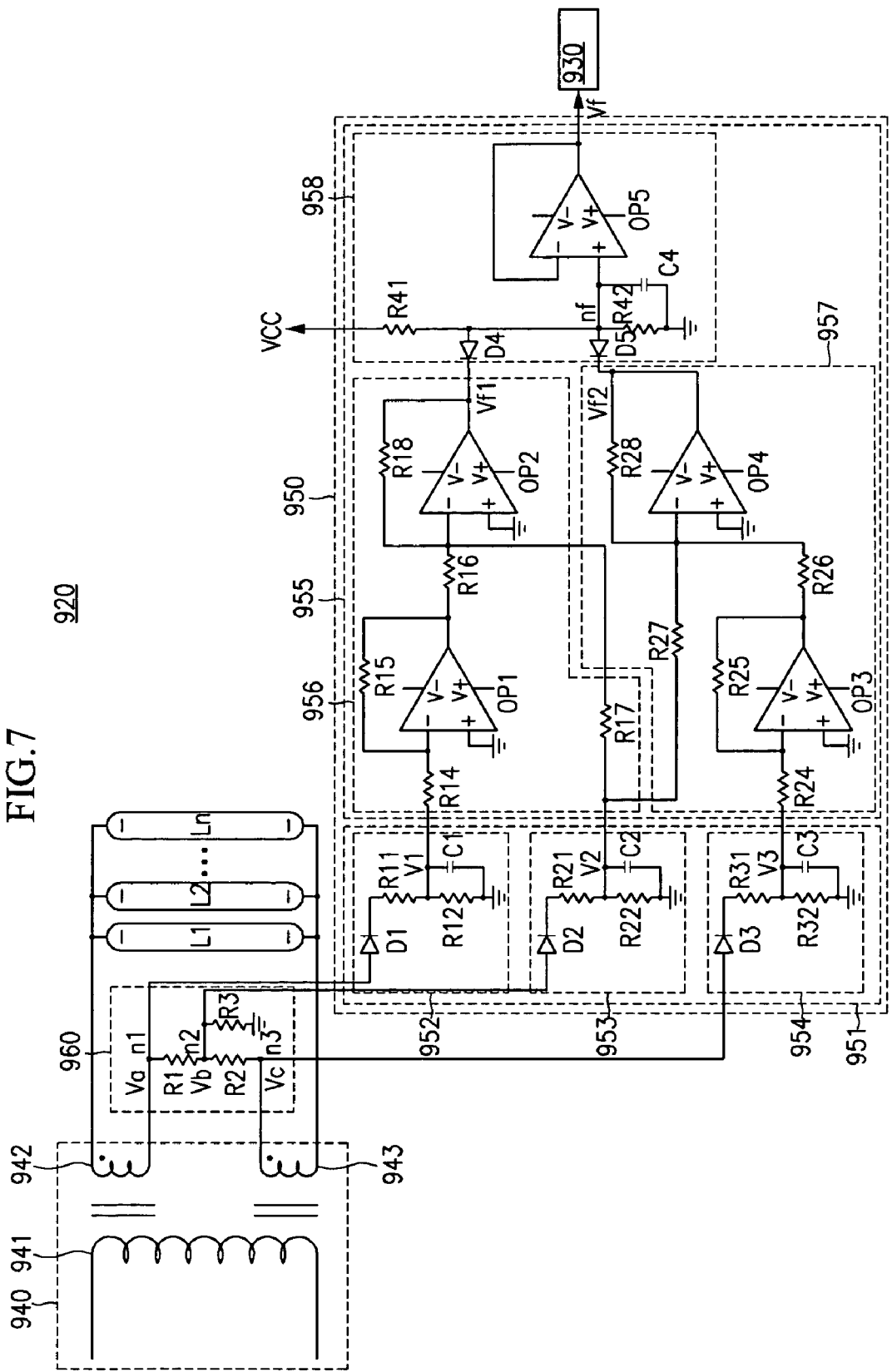
FIG. 7 is a circuit diagram of an inverter according to another embodiment of the present invention.

FIG. 7 is a circuit diagram of an inverter according to another embodiment of the present invention.

As shown in FIG. 7, the inverter 920 according to this embodiment includes a voltage converter 940, a current sensor 960 connected to the voltage converter 940, a feedback unit 950 connected to the voltage converter 940, and a controller 930 connected to the feedback unit 950 and the voltage converter 940.

Since the voltage converter 940, the current sensor 960, and the controller 930 shown in FIG. 7 have substantially the same configurations as those shown in FIG. 5, the detailed description thereof will be omitted.

The voltage converter 940 includes a primary coil 941 and a pair of secondary coils 942 and 943 for driving a plurality of lamps L1-Ln.

The current sensor 960 includes three resistors R1, R2 and R3.

The feedback unit 950 includes a rectifier block 951 and an operation block 955.

The rectifier block 951 includes first to third rectifiers 952, 953 and 954. Each of the rectifiers 952, 953 and 954 includes a diode D1, D2 or D3, a voltage divider, and a capacitor C1, C2 or C3. The diode D1 is connected from a node n1 between the secondary coil 942 and the resistor R1 to the voltage divider in a forward direction, the diode D2 is connected from a node n2 between the secondary coils 942 and 943 to the voltage divider in the forward direction, and the diode D3 is connected from a node n3 between the secondary coil 943 and the resistor R2 to the voltage divider in a forward direction. Each voltage divider includes a pair of resistors R11 and R12, R21 and R22, or R31 and R32 connected in series between the diode D1, D2 or D3 and a ground, and each capacitor C1, C2 or C3 connected across the resistor R12, R22 or R32.

The first rectifier 952 rectifies a voltage Va at the node n1 in the secondary coil 942 of the voltage converter 940 to produce a DC voltage V1, the second rectifier 953 rectifies a voltage Vb at the center node n2 between the secondary coils 942 and 943 of the voltage converter 940 to produce a DC voltage V2, and the third rectifier 954 rectifies a voltage Vc at the node n3 in the secondary coil 943 of the voltage converter 940 to produce a DC voltage V3.

The operation block 955 includes first and second operation units 956 and 957 and an output unit 958 connected thereto.

The first operation unit 956 is connected to the first and the second rectifiers 952 and 953 and includes first and second amplifiers OP1 and OP2 and a second operation unit 957 is connected to the second and the third rectifiers 953 and 954 and includes third and fourth amplifiers OP3 and OP4. The amplifiers OP1-OP4 have negative feedback connections with feedback resistors R15, R18, R25 and R28 and input resistors R14, R16, R17, R24, R26 and R27.

The output unit 958 is connected to the first and the second operation units 956 and 957 and includes a pair of diodes D4 and D5, a voltage divider, a capacitor C4, and a fifth amplifier OP5 having a negative feedback connection. The voltage divider includes a pair of resistors R41 and R42 connected in series between a supply voltage Vcc and a ground, and the capacitor C4 is connected across the resistor R42. The diodes D4 and D5 are connected from the voltage divider to the first and the second operation units 956 and 957, respectively.

Since each of the first and second operation units 956 and 957 has the same configuration as the operation unit 955 shown in FIG. 5, the detailed description thereof will be omitted.

An output signal Vf1 of the first operation unit 956 can be represented as a first-order function of the output signals V1 and V2 of the first and second rectifiers 952 and 953, and generated as a desired first-order function by appropriately setting the resistances R14-R18. Also, an output signal Vf2 of the second operation unit 957 can be represented as a first-order function of the output signals V2 and V3 of the second and third rectifiers 953 and 954, and generated as a desired first-order function by appropriately setting the resistances R24-R28.

When employing Equation (7), the first amplifier OP1 may invert the voltage V1 from the first rectifier 952 into −V1, and the second amplifier OP2 may generate the voltage Vf1 by adding the output voltage −V1 from the first amplifier OP1 and the output voltage V2 from the second rectifier 953 multiplied by two and then inverting the added voltage, the voltage Vf1 being expressed as:

$$Vf1=-[(-V1)+2\cdot V2]=V1-2\cdot V2.$$

Also, the second operation unit 957 generates the output signal Vf2 satisfying:

$$Vf2=-[(-V3)+2\cdot V2]=V3-2\cdot V2.$$

The output unit 958 selects a smaller one of the output voltages Vf1 and Vf2 from the first and second operation units 956 and 957 and outputs it as a feedback voltage Vf. The diodes D4 and D5 determine a signal path such that the smaller voltage is applied to a node nf between the resistors R41 and R42, and the fifth amplifier OP5 functions as a buffer transmitting the feedback voltage Vf at the node nf to the controller 930.

The previous embodiment generates the feedback voltage depending on the tube current under the assumption that the leakage current Ik is generated in only one of the secondary coils. However, this embodiment assumes that leakage currents are generated in both of the secondary coils 942 and 943 and selects a smaller one of the voltages Vf1 and Vf2 as the feedback signal Vf. Accordingly, the feedback signal Vf informs of the current of the secondary coil experiencing a larger leakage current.

Consequently, the inverter according to the present embodiment can produce the feedback voltage proportional to the tube current although the leakage current Ik is generated in any of the secondary coils 942 and 943.

Then, an inverter according to another embodiment of the present invention will be described in detail with reference to FIG. 8.

Figure 8:
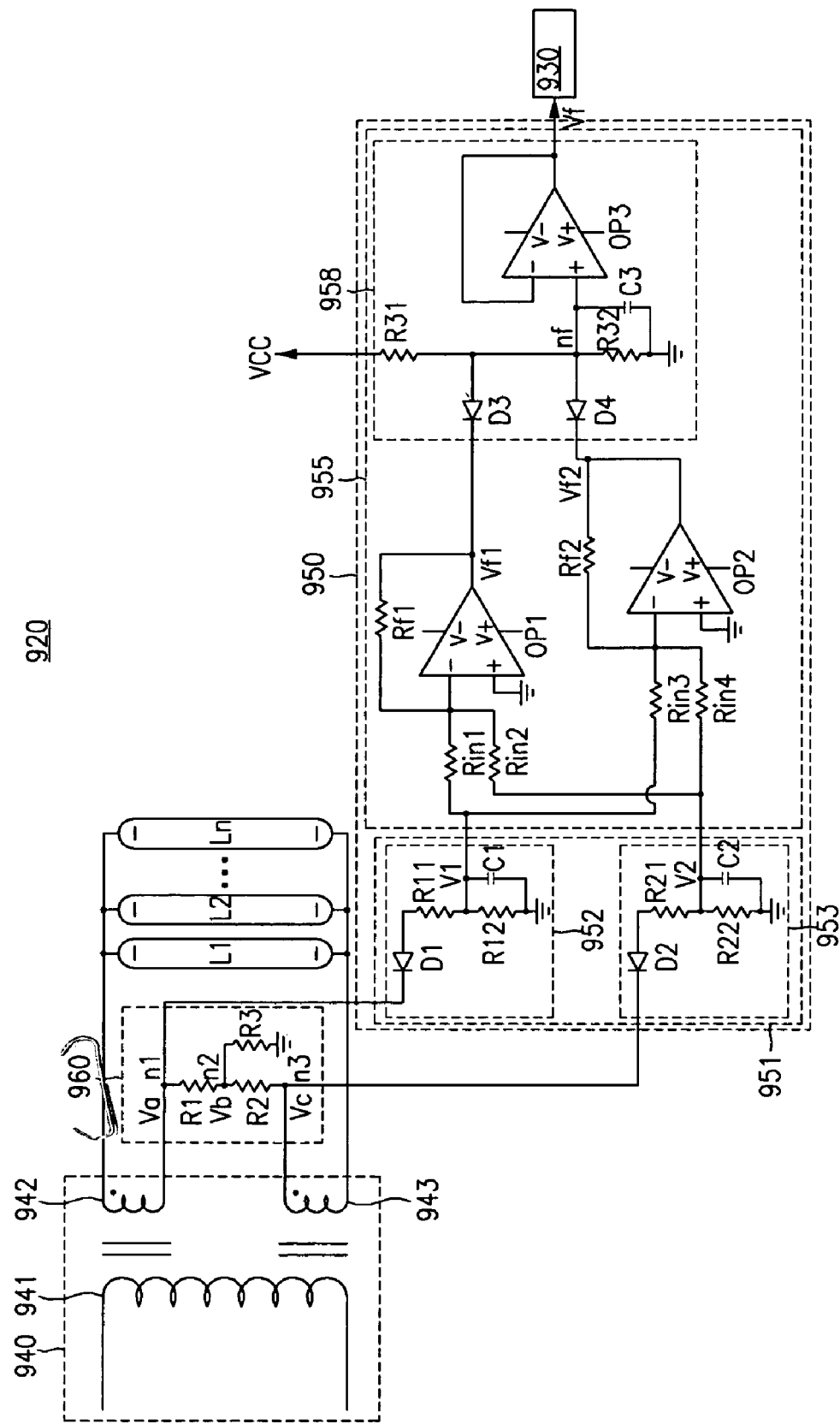
FIG. 8 is a circuit diagram of an inverter according to another embodiment of the present invention.

FIG. 8 is a circuit diagram of an inverter according to another embodiment of the present invention.

As shown in FIG. 8, the inverter 920 includes a voltage converter 940, a current sensor 960 connected to the voltage converter 940, a feedback unit 950 connected to the voltage converter 940, and a controller 930 connected to the feedback unit 950 and the voltage converter 940.

Figure 9:
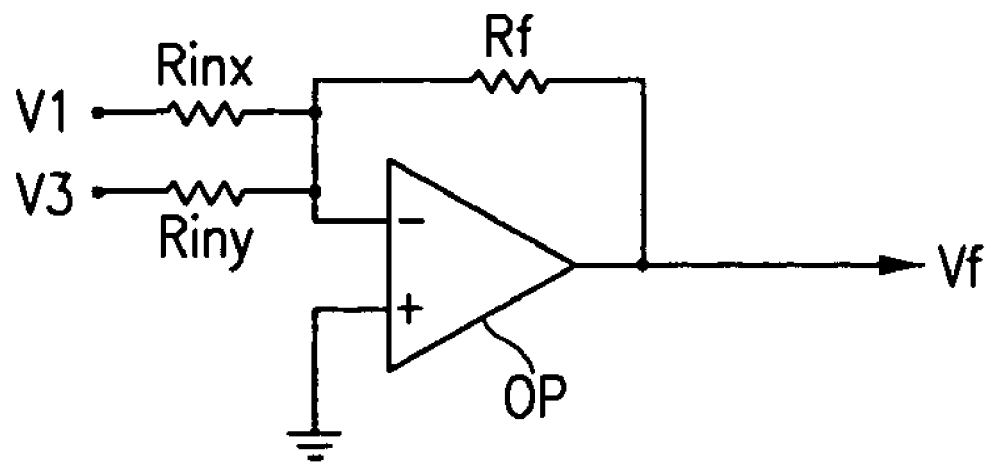
FIG. 9 is a circuit diagram of an operational amplifier in the inverter of FIG. 8.

Since the voltage converter 940, the current sensor 960, and the controller 930 shown in FIG. 9 has the substantially the same configurations as those shown in FIG. 5, the detailed description thereof will be omitted.

The voltage converter 940 includes a primary coil 941 and a pair of secondary coils 942 and 943 for driving a plurality of lamps L1-Ln.

The current sensor 960 includes a pair of resistors R1, R2 and R3.

The feedback unit 950 includes a rectifier unit 951 and an operation unit 955.

The rectifier unit 951 includes first and second rectifiers 952 and 953. Each of the first and the second rectifiers 952 and 953 includes a diode D1 or D2, a voltage divider, and a capacitor C1 or C2. The diode D1 is connected from the voltage divider to a node n1 between the secondary coil 942 and the resistor R1 in a forward direction, and the diode D2 is connected from the voltage divider to a node n2 between the secondary coils 942 and 943 in the forward direction. Each voltage divider includes a pair of resistors R11 and R12 or R21 and R22 connected series between the diode D1 or D2 and a ground, and each capacitor C1 or C2 is connected across the resistor R12 or R22. The bias direction of the diodes D1 and D2 shown in FIG. 8 is opposite to that shown in FIG. 5.

The first rectifier 952 rectifies a voltage Va at the node n1 in the secondary coil 942 of the voltage converter 940 to produce a DC voltage V1, while the second rectifier 953 rectifies a voltage Vc at the node n3 in the secondary coil 943 of the voltage converter 940 to produce a DC voltage V3.

The operation unit 955 includes first and second amplifiers OP1 and OP2 and an output unit 958 connected thereto.

The amplifiers OP1 and OP2 have negative feedback connections with feedback resistors Rf1 and Rf2 and input resistors Rin1-Rin4. Each of the amplifiers OP1 and OP2 has a non-inverting terminal (+), an inverting terminal (−), and an output terminal. The input resistors Rin1 and Rin2 are connected between the inverting terminal (−) of the first amplifier OP1 and the output voltages V1 and V3 of the first and the second rectifiers 952 and 953, respectively. The input resistors Rin3 and Rin4 are connected between the inverting terminal (−) of the second amplifier OP2 and the output voltages V1 and V3 of the first and the second rectifiers 952 and 953, respectively. The non-inverting terminals (+) of the first and second amplifiers OP1 and OP2 are grounded. The amplifiers OP1 and OP2 generate output signals Vf1 and Vf2, respectively, based on the relation between the resistances Rin1-Rin4, Rf1 and Rf2.

The output unit 958 is connected to the first and second amplifiers OP1 and OP2 and includes a pair of diodes D3 and D4, a voltage divider, a capacitor C3, and a third amplifier OP3 having a negative feedback connection. The voltage divider includes a pair of resistors R31 and R32 connected in series between a supply voltage Vcc and a ground, and the capacitor C3 is connected across the resistor R32. The diodes D3 and D4 are connected from the voltage divider to the first and the second amplifiers OP1 and OP2, respectively.

The operation unit 955 selects a smaller one of the output voltages Vf1 and Vf2 from the first and second amplifiers OP1 and OP2 and outputs it as a feedback voltage Vf. The diodes D3 and D4 determine a signal path such that the smaller voltage is applied to a node nf between the resistors R31 and R32, and the third amplifier OP3 functions as a buffer transmitting the feedback voltage Vf at the node nf to the controller 930.

The feedback unit 950 can produce the feedback signal Vf proportional to the tube current although the leakage current Ik is generated in any of the secondary coils 942 and 943. Furthermore, the feedback unit 950 can produce feedback signal Vf without receiving a voltage Vb at a center node n2, which will be described in detail with reference to FIG. 9 as well as FIG. 8.

FIG. 9 is a circuit diagram of any one of the operational amplifier OP1 and OP2 in the inverter 920 shown in FIG. 8.

Assuming that a leakage current Ik flows into the secondary coil 943, the currents I1 and I2 passing through the resistors R1 and R2 are given by:

$$I1=IL; \text{ and} \tag{8}$$

$$I2=IL+Ik, \tag{9}$$

where IL is a tube current flowing in the lamp.

Let R1=R2=R3=R, then I3=Ik, and the voltages Va and Vc at the nodes n1 and n3 are obtained as:

$$Va=I1 \cdot R+Vb=IL \cdot R-Ik \cdot R; \text{ and} \tag{10}$$

$$Vc=Vb-I2 \cdot R=-Ik \cdot R-(IL+Ik) \cdot R=-IL \cdot R-2 \cdot Ik \cdot R. \tag{11}$$

Ignoring the voltage drop by the diodes D1 and D2 and assuming that the voltage division ratio of the rectifiers 952 and 953 is so large to make the output voltages V1 and V3 substantially equal to the input voltages Va and Vc. Since the diodes D1 and D2 are biased in a reverse direction from the current sensor 960 to the voltage dividers, the voltages V1 and V3 are expressed as:

$$V1=-(IL \cdot R-Ik \cdot R)=-IL \cdot R+Ik \cdot R; \text{ and} \tag{12}$$

$$V3=-IL \cdot R-2 \cdot Ik \cdot R \tag{13}$$

Substitution of Equation (12) with Equation (13) in order to eliminate the terms including Ik yields:

$$IL \cdot R=-(2 \cdot V1+V3)/3. \tag{14}$$

In the meantime, an output signal Vf of an amplifier OP shown in FIG. 9 is given by:

$$Vf=-(Rf/Rinx) \cdot V1-(Rf/Riny) \cdot V3 \tag{15}$$

Equation (15) can become equivalent to Equation (14) by appropriately setting the resistances Rf, Rinx, and Riny. Accordingly, the resistances Rin1-Rin4, Rf1 and Rf2 shown in FIG. 9 are determined considering Equation (15). In this case, since Rinx=1.5·Rf and Riny=3·Rf, a proportional expression is obtained as Rf:Rinx:Riny=1:1.5:3.

Meanwhile, let us consider a feedback signal Vf1 on assumption that a leakage current Ik flows into the secondary coil 942. In this case, since Equations (1) to (4) are also employed, the voltages Va and Vc at the nodes n1 and n3 are expressed as:

$$Va=I1 \cdot R+Vb=IL \cdot R+2 \cdot Ik \cdot R; \text{ and} \tag{16}$$

$$Vb=Vb-I2 \cdot R=Ik \cdot R-IL \cdot R=-IL \cdot R+Ik \cdot R. \tag{17}$$

Ignoring the voltage drop by the diodes D1 and D2 and assuming that the voltage division ratio of the rectifiers 952 and 953 is so large to make the output voltages V1 and V2 substantially equal to the input voltages Va and Vb. The voltages V1 and V2 are expressed as:

$$V1=-(IL \cdot R+2 \cdot Ik \cdot R); \text{ and} \quad (18)$$

$$V3=-IL \cdot R+Ik \cdot R. \quad (19)$$

Substitution of Equation (18) with Equation (19) in order to eliminate the terms including Ik yields:

$$IL \cdot R=-(V1+2 \cdot V3)/3. \quad (20)$$

Equation (15) can become equivalent to Equation (20) by appropriately setting the resistances Rf, Rinx, and Riny. Accordingly, the resistances Rin1-Rin4, Rf1 and Rf2 shown in FIG. 9 are determined considering Equation (20). In this case, since Rinx=3·Rf, and Riny=1.5·Rf, a proportional expression is expressed as Rf:Rinx:Riny=1:3:1.5.

Applying the amplifier and the resistors shown in FIG. 9 to the operation unit 955 in FIG. 8, the feedback signal Vf proportional to the tube current can be produced although the leakage current is generated in any of the secondary coils 942 and 943. In FIG. 8, the respective output signals Vf1 and Vf2 of the first and second amplifiers OP1 and OP2 are expressed as the following equations:

$$Vf1=-(Rf1/Rin1) \cdot V1-(Rf1/Rin2) \cdot V3; \text{ and}$$

$$Vf2=-(Rf2/Rin3) \cdot V1-(Rf2/Rin4) \cdot V3.$$

Consequently, the output signals Vf1 and Vf2 of the first and second amplifier OP1 and OP2 can be represented as a first-order function of the output signals V1 and V3 of the first and second rectifiers 952 and 953, and generated as a desired first-order function by appropriately setting resistances of the resistors included in the operation unit 955.

The resistance ratios of the resistors included in the operation unit 955 are expressed as the following proportional expressions:

Rf1:Rin1:Rin2=1:3:1.5; and

Rf2:Rin3:Rin4=1:1.5:3.

For example, the resistances may be set to Rf1=Rf2=100 kΩ, Rin1=Rin4=300 kΩ, and Rin2=Rin3=150 kΩ.

As a result, the inverter according to the present embodiment can produce feedback signal Vf proportional to the tube current although the leakage current Ik is generated in any of the secondary coils 942 and 943. Furthermore, since the inverter can produce the feedback signal Vf without receiving a voltage Vb at a center node n2, it can be configured with simple circuits.

Meanwhile, the feedback unit 950 may be included in the controller 930.

Then, the positions and the configurations of the voltage converter 940 and the current sensor 960 are disposed will be described in detail with reference to FIG. 10.

Figure 10:
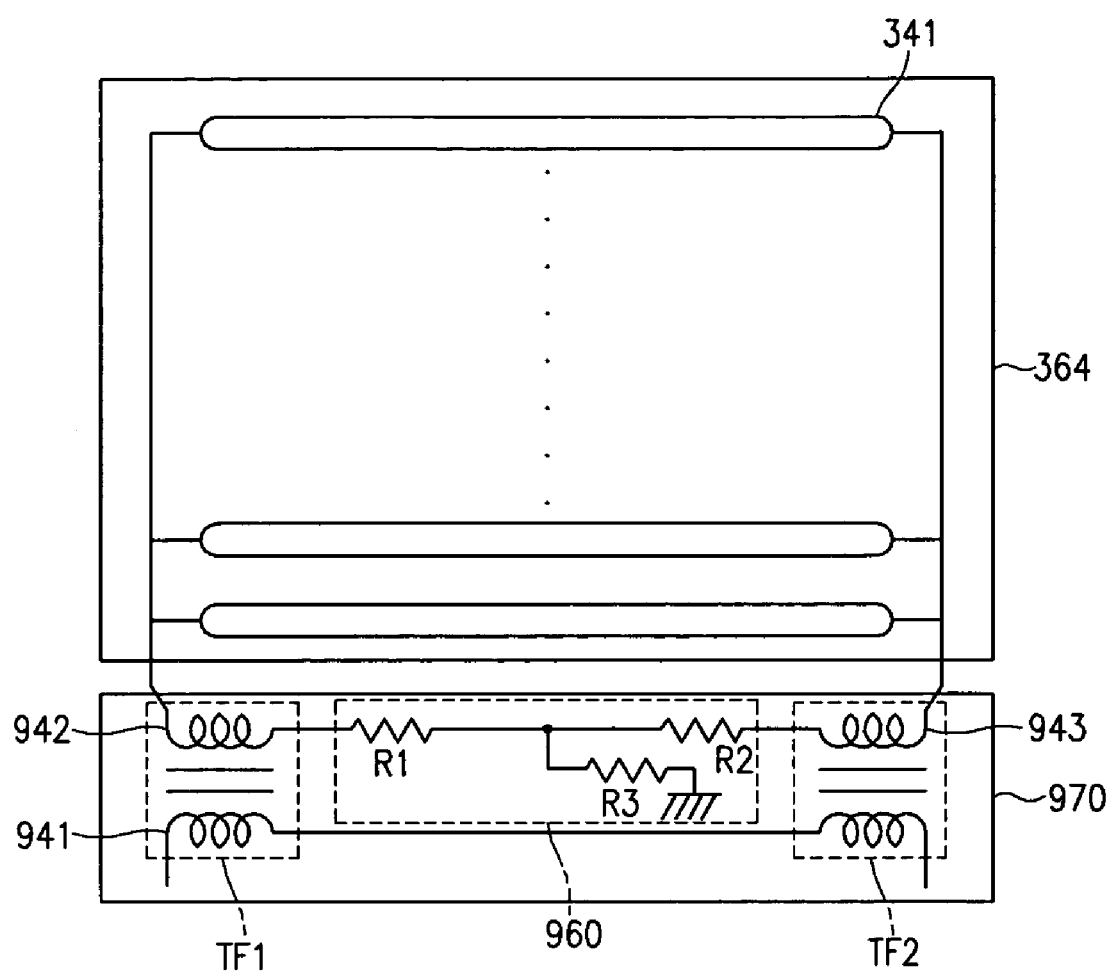
FIG. 10 shows lamps disposed in a mold frame and a portion of the inverter disposed in an inverter PCB.

FIG. 10 is a schematic diagram of lamps disposed in a mold frame and a portion of the inverter disposed in an inverter PCB.

As shown in FIG. 10, a mold frame 364 receives a plurality of lamps 341. Referring to FIG. 2, the mold frame 364 may also receive a diffuser 342, a plurality of optical sheets 343, and a reflector 344. The lamps 341 have external electrodes at their ends, which are connected in parallel such that the lamps are driven in parallel.

The inverter 920 is disposed in the inverter PCB 970. As shown in FIG. 10, the inverter PCB 970 is equipped with two transformers TF1 and TF2 and resistors R1-R3 forming a current sensor 960. Also, it is equipped with devices (not shown) such as capacitors, coils, amplifiers, and resistors forming a feedback unit 950 and a controller 930. The inverter PCB 970 may be disposed in the mold frame 364 or connected to the mold frame 364 through connectors (not shown) or wires.

The transformer TF1 includes a secondary coil 942 and a portion of a primary coil 941 facing the secondary coil 942, and the transformer TF2 includes a secondary coil 943 and another portion of the primary coil 941 facing the secondary coil 943. The transformers TF1 and TF2 are separate from each other in a length direction of the inverter PCB 970 and connected in series. One ends of the respective portions of the primary coil 941 in the transformers TF1 and TF2 are directly connected to each other, the other ends are connected to low-voltage AC voltage terminals (not shown) included in the voltage converter 940. One ends of the secondary coils 942 and 943 are connected to each other through the resistors R1 and R2 connected in series, and the other ends are connected to the electrodes of the lamps 341 in common.

The transformers TF1 and TF2 may be closely located in the inverter PCB 970 not like those shown in FIG. 10.

The cost of the inverter can be reduced and the size of the inverter can be decreased due to the divided transformers TF1 and TF2.

The inverter according to embodiments of the present invention can generate the feedback signal proportional to the tube current without being interfered by the leakage current, which are supplied for the controller 930, and thus the backlight unit can maintain uniform luminance under the floating type driving.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An inverter comprising:
    a voltage converter that converts a DC voltage from an external device into an AC voltage to drive at least a lamp and includes a primary coil and first and second secondary coils connected in series;
    a current sensor that senses at least a current flowing in the first or second secondary coil and generates at least a sensing signal based on the sensed at least a current, wherein the current sensor comprises first and second resistors connected in series between the first secondary coil and the second secondary coil, and a third resistor connected between a predetermined constant voltage and a first node between the first resistor and the second resistor, and further wherein a voltage at the first node is different from the predetermined constant voltage;
    a feedback signal generator that generates a feedback signal based on the at least a sensing signal from the current sensor; and
    a controller that controls the voltage converter based on the feedback signal such that a tube current flowing in the at least a lamp keeps substantially constant.

2. The inverter of claim 1, wherein the at least a lamp comprises a plurality of lamps connected in parallel.

3. The inverter of claim 1, wherein the voltage converter applies voltages having the same magnitude and different polarities to respective ends of the at least a lamp.

4. The inverter of claim 1, wherein the at least a lamp comprises an external electrode lamp.

5. The inverter of claim 1, wherein the first to third resistors have the same resistance.

6. The inverter of claim 1, wherein the at least a sensing signal includes a first voltage at a second node between the first secondary coil and the first resistor.

7. The inverter of claim 6, wherein the feedback signal generator rectifies the first voltage to generate the feedback signal.

8. The inverter of claim 6, wherein the at least a sensing signal further includes a second voltage at the first node between the first resistor and the second resistor.

9. The inverter of claim 8, wherein the feedback signal generator comprises:
a rectifier that rectifies the first and the second voltages; and
an operation unit that generates the feedback signal expressed as a first-order function of the rectified first and second voltages from the rectifier.

10. The inverter of claim 9, wherein the operation unit comprises:
a first amplifier that inverts the rectified first voltage; and
a second amplifier that doubles the rectified second voltage, adds the inverted first voltage from the first amplifier and the doubled rectified second voltage to generate a third voltage, and inverts the third voltage.

11. The inverter of claim 8, wherein the at least a sensing signal further includes a third voltage at a third node between the second secondary coil and the second resistor.

12. The inverter of claim 11, wherein the feedback signal generator comprises:
a rectifier that rectifies the first to third voltages;
a first operation unit that generates a first feedback signal expressed as a first-order function of the rectified first and second voltages; and
a second operation unit that generates a second feedback signal expressed as a first-order function of the rectified second and third voltages,
wherein the feedback signal includes a smaller one of the first and second feedback signals.

13. The inverter of claim 12, wherein the first operation unit comprises:
a first amplifier that inverts the rectified first voltage; and
a second amplifier that doubles the rectified second voltage, adds the inverter first voltage from the first amplifier and the doubled rectified second voltage to generate a fourth voltage, and inverts the fourth voltage, and the second operation unit comprises:
a third amplifier that inverts the rectified third voltage; and
a fourth amplifier that doubles the rectified second voltage, adds the inverted third voltage from the third amplifier and the doubled rectified second voltage to generate a fifth voltage, and inverts the fifth voltage.

14. The inverter of claim 6, wherein the at least a sensing signal further includes a second voltage at a third node between the second secondary coil and the second resistor.

15. The inverter of claim 14, wherein the feedback signal generator comprises:
a rectifier that rectifies the first and second voltages;
a first operation unit that generates a first feedback signal expressed as a first-order function of the rectified first and second voltages; and
a second operation unit that generates a second feedback signal expressed as another first-order function of the rectified first and second voltages,
wherein the feedback signal includes a smaller one of the first and second feedback signals.

16. The inverter of claim 15, wherein the first operation unit comprises:
a fourth resistor;
a fifth resistor;
a first feedback resistor; and
a first amplifier that receives the first and second voltages through the fourth and fifth resistors, respectively, and has a negative feedback connection through the first feedback resistor, and the second operation unit comprises:
a sixth resistor;
a seventh resistor;
a second feedback resistor; and
a second amplifier that receives the first and second voltages through the sixth and seventh resistors, respectively, and has a negative feedback connection through the second feedback resistor.

17. The inverter of claim 16, wherein a resistance ratio of the first feedback resistor, the fourth resistor, and the fifth resistor is about 1:3:1.5, and a resistance ratio of the second feedback resistor, the sixth resistor, and the seventh resistor, is about 1:1.5:3.

18. The inverter of claim 1, wherein the primary coil comprises a first portion coupled with the first secondary coil to form a first transformer and a second portion coupled with the second secondary coil to form a second transformer, and the first transformer and a second transformer is spaced apart from each other on a printed circuit board.

19. The inverter of claim 18, wherein the first and second transformers are located near respective ends of the printed circuit board in a length direction.

* * * * *